United States Patent [19]
Brotto

[11] Patent Number: 6,008,628
[45] Date of Patent: Dec. 28, 1999

[54] METHOD FOR CHARGING BATTERIES

[75] Inventor: Daniele C. Brotto, Baltimore, Md.

[73] Assignee: Black & Decker Inc., Newark, Del.

[21] Appl. No.: 09/112,680

[22] Filed: Jul. 9, 1998

Related U.S. Application Data

[60] Provisional application No. 60/056,758, Aug. 20, 1997.

[51] Int. Cl.$^6$ .......................................................... H02J 7/00
[52] U.S. Cl. ............................................. 320/137; 320/151
[58] Field of Search .................................... 320/137, 150, 320/151, 156, 155

[56] References Cited

U.S. PATENT DOCUMENTS

| | | | |
|---|---|---|---|
| 4,125,802 | 11/1978 | Godard | 320/150 |
| 4,308,492 | 12/1981 | Mori et al. | 322/28 |
| 4,388,582 | 6/1983 | Saar et al. | 320/156 |
| 4,392,101 | 7/1983 | Saar et al. | 320/156 |
| 5,166,596 | 11/1992 | Goedken | 320/150 |
| 5,329,219 | 7/1994 | Garrett | 320/150 |
| 5,463,305 | 10/1995 | Koenck | 320/145 |
| 5,504,416 | 4/1996 | Holloway et al. | 320/152 |
| 5,519,303 | 5/1996 | Goedken et al. | 320/150 |
| 5,550,453 | 8/1996 | Bohne et al. | 320/148 |
| 5,563,494 | 10/1996 | Cuesta et al. | 320/150 |
| 5,563,496 | 10/1996 | Mc Clure | 320/128 |
| 5,714,868 | 2/1998 | Uchida et al. | 320/150 |
| 5,744,937 | 4/1998 | Cheon | 320/150 |
| 5,896,024 | 4/1999 | Bradus et al. | 320/125 |

*Primary Examiner*—Peter S. Wong
*Assistant Examiner*—Lawrence Luk
*Attorney, Agent, or Firm*—Adan Ayala

[57] ABSTRACT

A method for charging and monitoring a rechargeable battery is proposed. The charging method includes charging a rechargeable battery, sensing temperature of said battery, and calculating temperature change rate. The method further includes sensing voltage of said battery after the temperature change rate reaches a predetermined value, calculating voltage change rate, and reducing current sent to the battery when the voltage change rate reaches a predetermined value. A second embodiment of the charging method may include charging a rechargeable battery, sensing temperature and voltage of said battery, and calculating temperature and voltage change rates. The method further includes sensing for a maximum voltage change rate after the temperature change rate reaches a predetermined value, and reducing current sent to the battery when the maximum voltage change rate is sensed. In addition, the method may include sensing for a minimum voltage change rate before sensing for the maximum change rate, wherein sensing for the maximum change rate would begin after the temperature change rate reaches a predetermined value or after the minimum voltage change rate is sensed.

20 Claims, 3 Drawing Sheets

METHOD FOR CHARGING BATTERIES

This application claims benefit of Provisional Application Ser. No. 60/056,758 filed Aug. 20, 1997.

FIELD OF THE INVENTION

This invention relates generally to a method for charging and monitoring rechargeable batteries.

BACKGROUND OF THE INVENTION

The several advantages of cordless power for portable power tools and certain kitchen and domestic appliances have led to the development of a wide range of sizes of power- or battery-packs, that is, a contained group of power cells. These power cells may include nickel cadmium (NiCd), nickel metal hydride (NiMH), lithium, or lead-acid cells, etc.

FIG. 2 shows illustrating a typical voltage and temperature curves of a battery during charging. As shown in the voltage curve V, the voltage of the battery typically does not increase linearly. Instead, the battery voltage increases until an area A is reached, where the battery voltage increases slowly. The battery voltage then rapidly increases until a voltage peak B is reached. Full charge of the battery occurs just before voltage peak B.

If the charging process is not terminated, the battery would then be overcharged, possibly damaging the battery. As shown in the voltage curve V, the battery voltage also decreases when the battery is overcharged.

During the charging process, the battery temperature also varies. FIG. 2 shows a typical temperature curve T for a battery being charged, when the battery temperature before charging is around room temperature. As indicated in temperature curve T, the battery temperature begins to rise around or after the area A is reached. The temperature then continues to increase until the charging process is terminated. If the charging process is not stopped when the battery is fully charged, the battery could be overcharged and thus damaged by the rising temperature. Accordingly, battery temperature or battery voltage are usually monitored as indicators of the full charge condition.

Among the voltage monitoring methods, the Saar double inflection termination method described in U.S. Pat. Nos. 4,388,582 and 4,392,101, is preferred to detect a battery reaching full charge. However, while the double inflection method avoids overcharging of a battery that was completely discharged, the method is difficult to implement with already fully or mostly charged batteries, as well non-expressive batteries, such as NiMH batteries, which have depressed voltage curves.

Other voltage monitoring methods more typically employed are (1) the minus-delta-voltage method, (2) the peak detect method, and (3) the voltage slope detect method. In the minus-delta-voltage method, a sample of the battery peak voltage is stored and compared to the most recent voltage. Termination occurs when the most recent voltage falls below a set point, usually within between 0.5% and 1.0% of the stored peak, or about 10 to 20 millivolts per cell.

The peak detect method is more modem version of the minus-delta-voltage method. Basically, the same method is used, except the set point can be set closer to the peak by using more accurate instrumentation. Both of these methods, however, tend to overcharge the battery, reducing battery life.

The slope detect method is another voltage monitoring method. According to this method, the voltage peak B is detected by calculating the slope of the voltage curve V, or voltage change rate (dV/dt). Termination occurs when the voltage change rate is 0 or negative. This method also tends to overcharge the battery, reducing battery life.

However, the slope detect method has another drawback. Under this method, the area A may be confused with voltage peak B because of the small slope. This could cause the termination of the charging process, resulting in undercharged batteries.

Current temperature monitoring methods are also problematic. Temperature monitoring methods typically employed are (1) absolute temperature termination and (2) temperature change rate termination. Absolute temperature termination relies on the temperature rise that occurs when the battery is fully charged. Under this method, the charging process will be stopped when the battery temperature reaches a certain temperature. However, because the largest temperature rise usually occurs after the battery is frilly charged and during the overcharge period, battery life and performance are adversely affected.

The temperature change rate termination method requires monitoring the changing slope of the battery temperature, or temperature change rate (dT/dt), during the charging process. Termination occurs when the temperature change rate reaches and/or exceeds a predetermined rate. In other words, termination occurs when a trip point is reached and/or exceeded. However, selecting the appropriate trip point is problematic, especially under conditions of varying ambient temperature conditions. Accordingly, the method may cause undercharged or overcharged batteries.

It is preferable to provide a charging and monitoring method that will not result in undercharged or overcharged batteries.

SUMMARY OF THE INVENTION

In accordance with the present invention, a method for charging and monitoring a rechargeable battery is proposed. The charging method includes charging a rechargeable battery, sensing temperature of said battery, and calculating temperature change rate. The method further includes sensing voltage of said battery after the temperature change rate reaches a predetermined value, calculating voltage change rate, and reducing current sent to the battery when the voltage change rate reaches a predetermined value.

Similarly, the charging method may include charging a rechargeable battery, sensing temperature and voltage of said battery, and calculating temperature and voltage change rates. The method further includes sensing for a maximum voltage change rate after the temperature change rate reaches a predetermined value, and reducing current sent to the battery when the maximum voltage change rate is sensed. In addition, the method may include sensing for a minimum voltage change rate before sensing for the maximum change rate, wherein sensing for the maximum change rate would begin after the temperature change rate reaches a predetermined value or after the minimum voltage change rate is sensed.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which.

DETAILED DESCRIPTION

Figure 1:
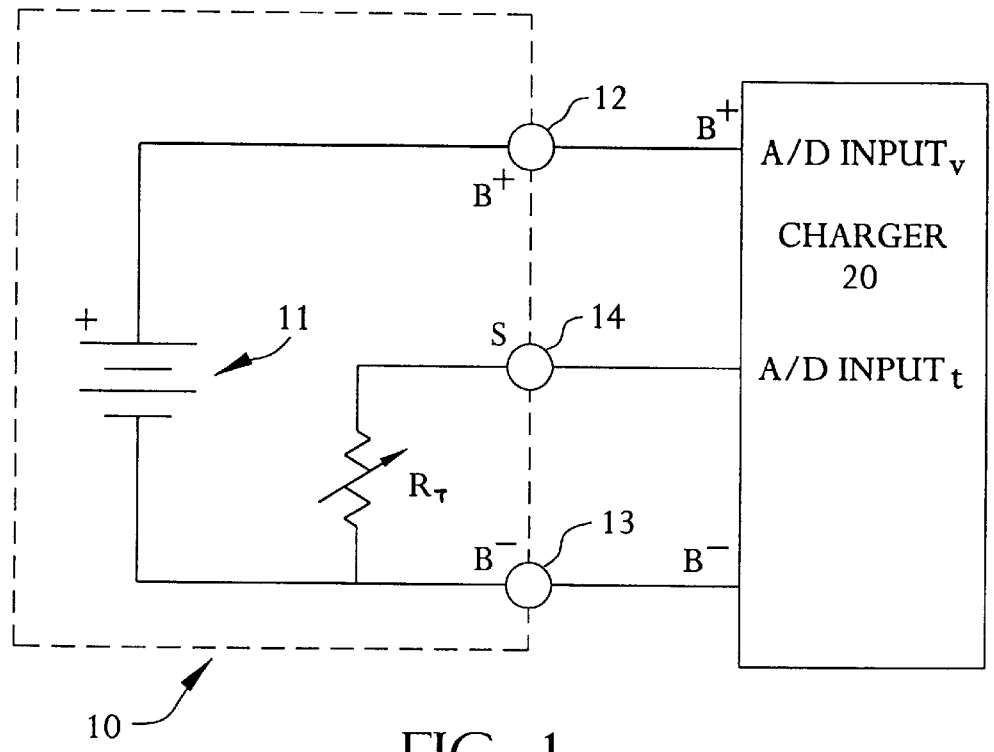
FIG. 1 is a circuit schematic diagram of a battery to be charged according to the method of the present invention.

The invention is now described with reference to the accompanying figures, wherein like numerals designate like parts. The apparatus disclosed below, however, is only disclosed for exemplary purposes, as the proposed method can be carried out by other battery-charger combinations. In addition, all the teachings of the Saar U.S. Pat. Nos. 4,388,582 and 4,392,101 are hereby incorporated by reference into this specification. Referring to FIG. 1, a battery 10 is connected to a charger 20. Battery 10 comprises one or more battery cells 11, which dictate the voltage and storage capacity for battery 10.

Battery 10 includes three battery charging contacts: first battery contact 12, second battery contact 13, and third battery contact 14. Battery contact 12 is the B+ (positive) terminal for battery 10. Battery contact 13 is the B− or ground terminal. Battery contact 14 is the S or sensing terminal.

As shown in FIG. 1, the battery cells 11 are coupled between the battery contacts 12 and 13. In addition, coupled between battery contacts 13 and 14 is a temperature sensing device, such as a negative temperature co-efficient NTC) resistor, or thermistor, $R_T$. The temperature sensing device allows monitoring of the battery temperature. Persons skilled in the art will recognize that other components, such as capacitors, etc., or circuits can be used to provide a signal representative of the battery temperature.

The charger 20 includes positive and negative (B+ and B−) terminals which are coupled to battery 10 via battery contacts 12 and 13. The positive terminal may also act as an analog/digital input $A/DINPUT_V$, in order to detect the battery voltage. In addition, the charger 20 includes an analog/digital input $A/DINPUT_T$, which is coupled to battery 10 via the third battery contact 14 (S). This allows the charger 20 to monitor the battery temperature.

Figure 3:
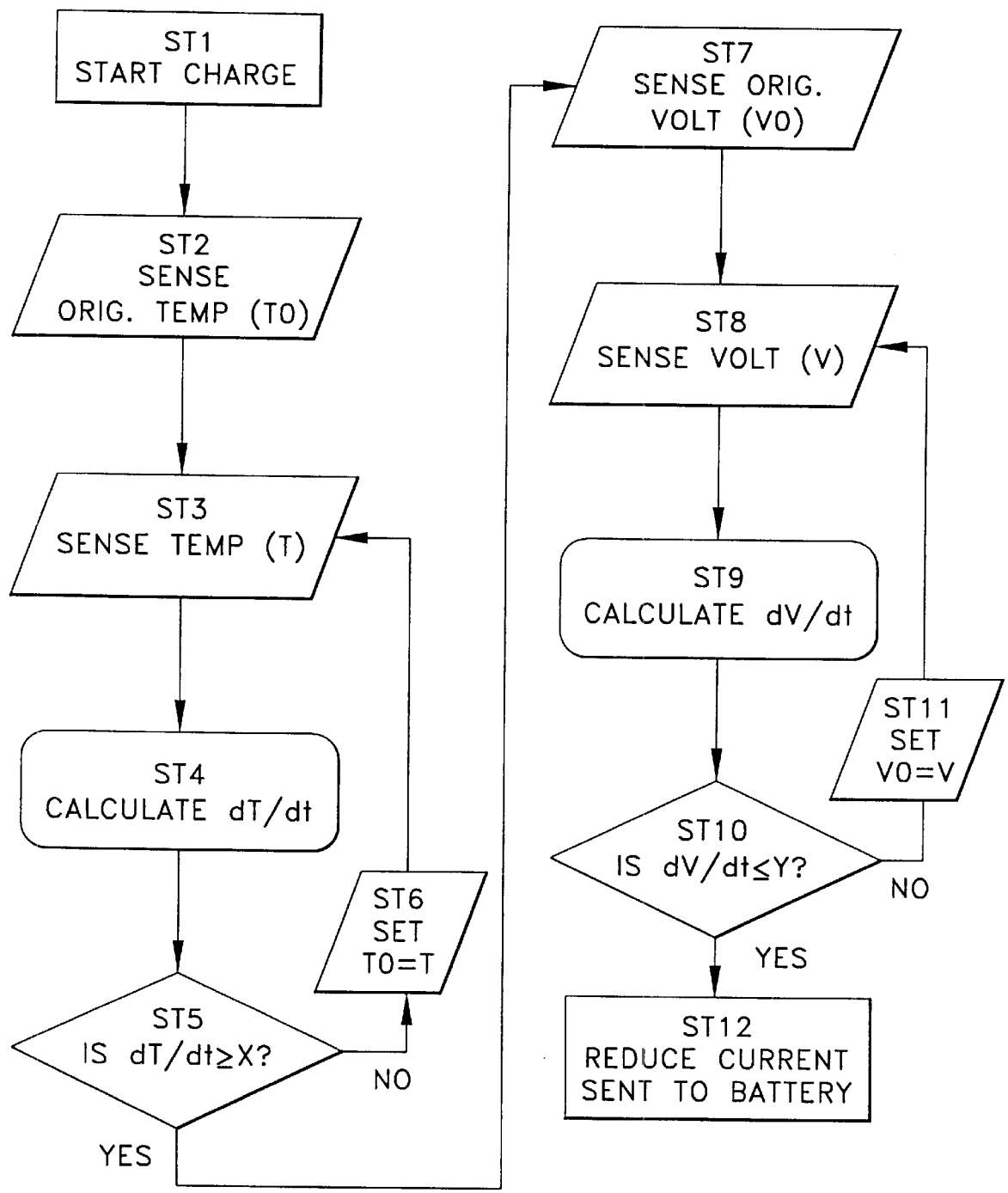
FIG. 3 is a flowchart illustrating the monitoring and charging process according to the present invention.

FIG. 3 is a flowchart of the different steps included in the proposed method. The first step (ST1) is to begin the charging process. The charger 20 sends a current into the battery, in order to recharge the battery. The charger 20, via its A/D inputs, obtains the original, or starting, battery temperature T0 (ST2). The charger 20 continues to monitor and store the battery temperature (ST3) in order to calculate the temperature change rate (dT/dt) (ST4).

Figure 2:
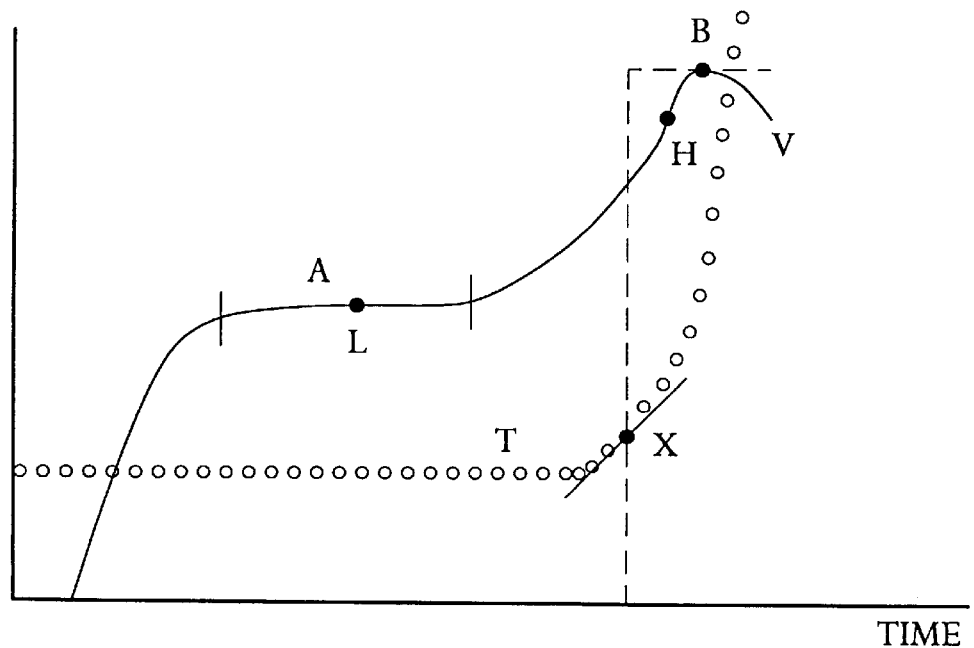
FIG. 2 is a graph illustrating the voltage and temperature curves for the battery of FIG. 1 during the charging period.

The charger 20 then checks whether the temperature change rate is equal to or exceeds a predetermined temperature change rate X (ST5). The change rate X is usually empirically selected to ensure that the battery voltage will be between the area A and the voltage peak B when the change rate X is reached, as shown in FIG. 2. For example, an appropriate change rate trigger for many batteries would between 0.1 and 2 degrees per minute, with a range between 0.5 and 1.2 degree per minute being the preferred range for NiCd batteries. If the predetermined change rate X has not been reached, the charger 20 sets the original temperature T0 to be the latest sensed temperature T (ST6), senses the new battery temperature T (ST3) and calculates the temperature change rate (ST4). The charger 20 will continue this process until the predetermined change rate X is reached.

Once the predetermined change rate X is reached, the charger 20 then senses the original, or starting, battery voltage V0 (ST7). The charger 20 continues to monitor and store the battery voltage (ST8) in order to calculate the voltage change rate (dV/dt) (ST9). The charger 20 then checks whether the voltage change rate is equal to or less than a predetermined voltage change rate Y (ST10). For example, the predetermined voltage change rate may be about zero volts per minute so that the voltage peak B is identified. However, persons skilled in the art will recognize that selecting other change rates, such as small positive change rates, will allow termination of the charging process before the voltage peak B is reached, assuring that the battery will not be overcharged. Accordingly, the predetermined voltage change rate Y preferably is less than 0.2 millivolts per cell per minute and preferably within 0.1 and 0.0 millivolts per cell per minute.

Once the predetermined voltage change rate Y is reached, the charging process is slowed by reducing the current being sent to the battery (ST12). It is preferable to reduce the current so that the battery receives a maintenance charge or a reduced charge. (See Saar U.S. Pat. Nos. 4,388,582 and 4,392,101). The maintenance charge current can then be completely cut off after a certain period of time. Nevertheless, persons skilled in the art will recognize that, if current is not sent to the battery once the predetermined voltage change rate Y is reached, the current has in effect been reduced.

If the predetermined change rate Y has not been reached, the charger 20 sets the original voltage V0 to be the latest sensed voltage V (ST11), senses the new battery voltage V (ST8) and calculating the voltage change rate (ST9). The charger 20 will continue this process until the predetermined change rate Y is reached.

Persons skilled in the art will recognize that the process described above can be done in parallel, i.e., the charger 20 will conduct the voltage and temperature comparisons at the same time rather than sequentially.

Figure 4:
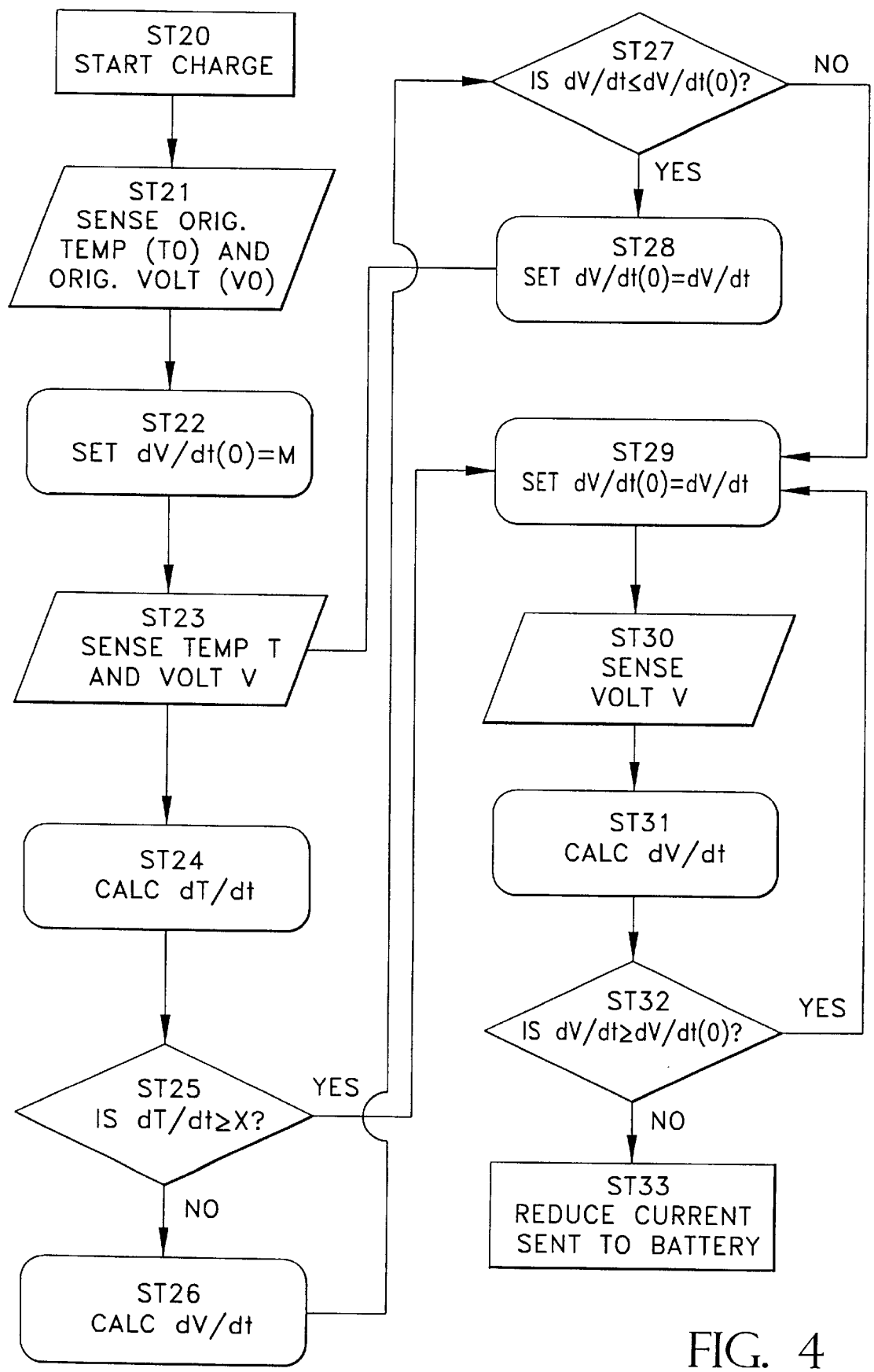
FIG. 4 is another flowchart illustrating an alternative monitoring and charging process according to the present invention.

FIG. 4 is a flowchart of the different steps included in an alternative embodiment of the proposed method. The first step (ST20) is to begin the charging process. As discussed above, the charger 20 sends a current into the battery, in order to recharge the battery. The charger 20 obtains the original, or starting, battery temperature T0 and original, or starting, voltage V0 (ST21). The charger 20 then sets original, or starting, voltage change rate dV/dt(0) equal a value M. The value M may be a high value and is preferably a practically unrealistic high value.

The charger 20 continues to monitor and store the battery temperature and voltage (ST23) in order to calculate the temperature change rate (dT/dt) (ST24). The charger 20 then checks whether the temperature change rate is equal to or exceeds a predetermined temperature change rate X (ST25). As discussed above, the temperature change rate X is usually empirically selected to ensure that the battery voltage will be between the area A and the voltage peak B when the change rate X is reached, as shown in FIG. 2. For example, an appropriate change rate trigger for many batteries would between 0.1 and 2 degrees per minute, with a range between 0.5 and 1 degree per minute being the preferred range for NiCd batteries.

If the predetermined temperature change rate X has not been reached, the charger 20 calculates the voltage change rate (dV/dt) (ST26). The charger 20 checks whether the voltage change rate is equal to or smaller than the original voltage change rate (ST27). If so, the charger 20 sets the original voltage change rate to equal the voltage change rate (ST28). By doing so, the charger 20 can later detect when the latest voltage change rate is larger than the original voltage change rate, and thus identify whether a minimum change rate has been reached (which would be near point L in FIG. 2). The charger 20 then continues to sense the battery temperature and voltage (ST23) and checking whether the predetermined temperature change rate X has been reached.

If the predetermined temperature change rate X has been reached, or if the minimum voltage change rate has been reached, the charger 20 then begins sensing for the maximum voltage change rate. To do so, the charger 20 sets the original voltage change rate to equal the latest voltage change rate (ST29). The charger 20 then senses the current battery voltage (ST30) and calculates the voltage change rate (ST31).

The charger 20 checks whether the voltage change rate is equal to or larger than the original voltage change rate (ST32). If so, the charger continues to set the original voltage change rate to equal the latest voltage change rate (ST29), sense the battery voltage (ST30) and comparing the voltage change rates (ST31 and ST32), until the latest voltage change rate is smaller than the original change rate. When this condition is met, the maximum voltage change rate has been sensed and identified (usually near point H in FIG. 2), signaling that the voltage peak B is relatively near.

In order to prevent overcharging of the battery, it is preferable slow the charging process by reducing the current being sent to the battery (ST33). Again, it is preferable to reduce the current so that the battery receives a maintenance charge. (See Saar U.S. Pat. Nos. 4,388,582 and 4,392,101). The maintenance charge current can then be completely cut off after a certain period of time. Nevertheless, persons skilled in the art will recognize that, if current is not sent to the battery once the maximum voltage change rate has been sensed, the current has in effect been reduced.

Persons skilled in the art may recognize other alternatives or additions to the means or steps disclosed herein. For example, level thresholds may be implemented in the monitoring and charging method in order to avoid proceeding to the next step based on signal noise, nonrepresentative measurements, etc. However, all these additions and/or alterations are considered to be equivalents of the present invention.

What is claimed is:

1. A method for charging rechargeable batteries comprising the steps of:
   charging a rechargeable battery;
   sensing temperature of said battery;
   calculating temperature change rate;
   sensing voltage of said battery after the temperature change rate reaches a first predetermined value;
   calculating voltage change rate; and
   reducing current sent to the battery when the voltage change rate reaches a second predetermined value.

2. The method of claim 1, wherein the current reducing step comprises not sending any current to the battery.

3. The method of claim 1, wherein the first predetermined value is between about 0.1 and 2 degrees per minute.

4. The method of claim 1, wherein the first predetermined value is between 0.5 and 1 degrees per minute.

5. The method of claim 1, wherein the second predetermined value is less than 0.2 millivolts per cell.

6. The method of claim 1, wherein the second predetermined value is less than 0.1 millivolts per cell.

7. A method for charging rechargeable batteries comprising the steps of:
   charging a rechargeable battery;
   sensing temperature and voltage of said battery;
   calculating temperature and voltage change rates;
   sensing for a maximum voltage change rate after the temperature change rate reaches a first predetermined value; and
   reducing current sent to the battery when the maximum voltage change rate reaches a second predetermined value.

8. The method of claim 7, further comprising the step of sensing for a minimum voltage change rate before sensing for the maximum change rate.

9. The method of claim 8, wherein sensing for the maximum change rate begins after the temperature change rate reaches the first predetermined value or after the minimum voltage change rate reaches a third predetermined value.

10. The method of claim 7, wherein the current reducing step comprises not sending any current to the battery.

11. The method of claim 7, wherein the first predetermined value is between about 0.1 and 2 degrees per minute.

12. The method of claim 7, wherein the first predetermined value is between 0.5 and 1 degrees per minute.

13. The method of claim 7, wherein the second predetermined value is less than 0.2 millivolts per cell.

14. The method of claim 7, wherein the second predetermined value is less than 0.1 millivolts per cell.

15. A charger for charging rechargeable batteries comprising:
   at least three terminals for connecting the charger to a rechargeable battery;
   a current source connected to at least one of the terminals for providing current to the battery;
   a controller connected to the current source and at least one of the terminals for controlling the current sent to the battery, sensing battery voltage and temperature and calculating temperature and voltage change rates;
   wherein said controller senses voltage of said battery after the temperature change rate reaches a first predetermined value, and reduces current sent to the battery when the voltage change rate reaches a second predetermined value.

16. The charger of claim 15, wherein the first predetermined value is between about 0.1 and 2 degrees per minute.

17. The charger of claim 15, wherein the second predetermined value is less than 0.2 millivolts per cell.

18. A charger for charging rechargeable batteries comprising:
   at least three terminals for connecting the charger to a rechargeable battery;
   a current source connected to at least one of the terminals for providing current to the battery;
   a controller connected to the current source and at least one of the terminals for controlling the current sent to the battery, sensing battery voltage and temperature and calculating temperature and voltage change rates;
   wherein said controller senses for a maximum voltage change rate after the temperature change rate reaches a first predetermined value, and reduces current sent to the battery when the maximum voltage change rate reaches a second predetermined value.

19. The charger of claim 18, wherein the controller senses for a minimum voltage change rate before sensing for the maximum change rate.

20. The charger of claim 19, wherein sensing for the maximum change rate begins after the temperature change rate reaches the first predetermined value or after the minimum voltage change rate reaches a third predetermined value.

* * * * *